(12) United States Patent
Kukoff

(10) Patent No.: US 8,808,556 B2
(45) Date of Patent: Aug. 19, 2014

(54) EMBROIDERY AND METHOD OF MAKING SAME

(76) Inventor: Michael Kukoff, West Orange, NJ (US)

( * ) Notice: Subject to any disclaimer, the term of this patent is extended or adjusted under 35 U.S.C. 154(b) by 148 days.

(21) Appl. No.: 13/589,345

(22) Filed: Aug. 20, 2012

(65) Prior Publication Data

US 2014/0050899 A1    Feb. 20, 2014

(51) Int. Cl.
*B44C 1/22* (2006.01)
*D06Q 1/02* (2006.01)
*D06Q 1/10* (2006.01)
*B32B 38/10* (2006.01)

(52) U.S. Cl.
CPC *B44C 1/227* (2013.01); *D06Q 1/02* (2013.01); *D06Q 1/10* (2013.01); *B32B 38/10* (2013.01)
USPC ............ 216/28; 216/83; 427/198; 427/208.2; 427/264; 427/275; 427/288

(58) Field of Classification Search
None
See application file for complete search history.

(56) References Cited

U.S. PATENT DOCUMENTS

| | | | | | |
|---|---|---|---|---|---|
| 3,377,184 | A | * | 4/1968 | Kukoff | 428/196 |
| 3,806,397 | A | * | 4/1974 | Kukoff | 428/41.1 |
| 4,352,380 | A | * | 10/1982 | Owen et al. | 139/426 R |
| 4,466,860 | A | * | 8/1984 | Aggio | 216/83 |
| 5,417,754 | A | * | 5/1995 | Hester | 106/162.9 |
| 5,597,434 | A | * | 1/1997 | Kukoff | 156/240 |
| 5,912,065 | A | * | 6/1999 | Kukoff | 428/195.1 |
| 6,200,410 | B1 | * | 3/2001 | Kukoff | 156/320 |
| 6,524,648 | B2 | * | 2/2003 | Kukoff | 427/197 |
| 2008/0178394 | A1 | * | 7/2008 | Hester | 8/114.6 |
| 2013/0115395 | A1 | * | 5/2013 | Johnson | 428/35.2 |

* cited by examiner

*Primary Examiner* — Anita Alanko
(74) *Attorney, Agent, or Firm* — Kirschstein, et al.

(57) ABSTRACT

Chemical burnout is used on fabrics having beaded and/or glittered areas to create embroidery that realistically simulates hand-sewn embroidery. A chemical fluid etchant is printed only on selected areas of a pattern on a fabric of cellulose fibers. Preferably, the fabric is a composite fabric that also has non-cellulose fibers. A curable fluid adhesive is printed only on other selected areas of the pattern. Ornamental particles are deposited onto the curable adhesive. The composite fabric is heated to cure the adhesive and fix the particles to the other selected areas, and to simultaneously activate the etchant to dissolve the cellulose fibers at the selected areas. The chemical etchant is removed by rinsing the composite fabric.

9 Claims, 2 Drawing Sheets

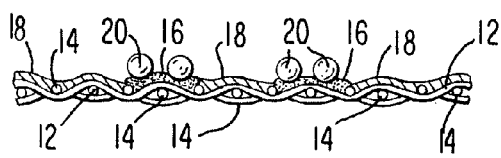
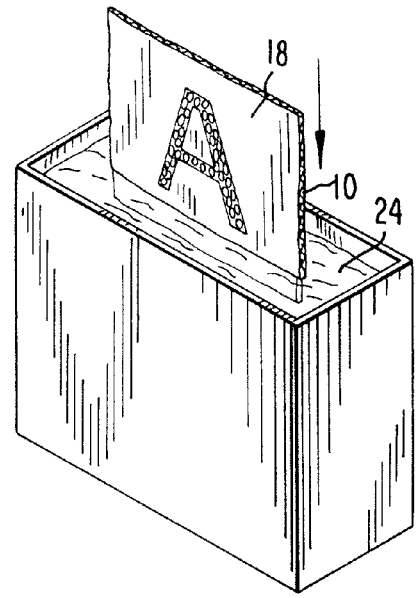
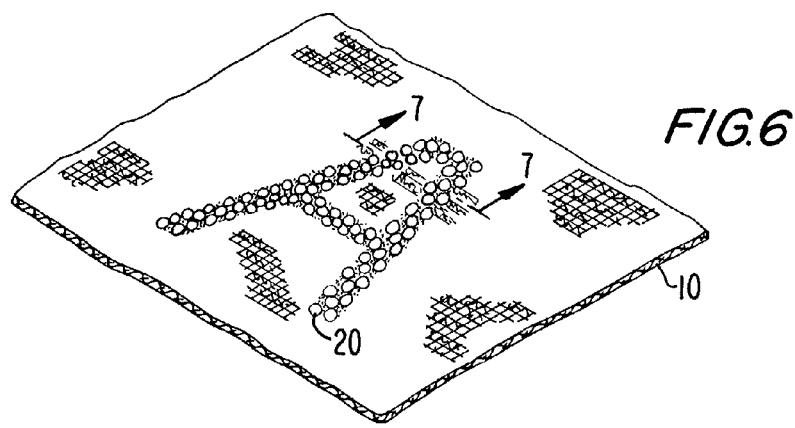
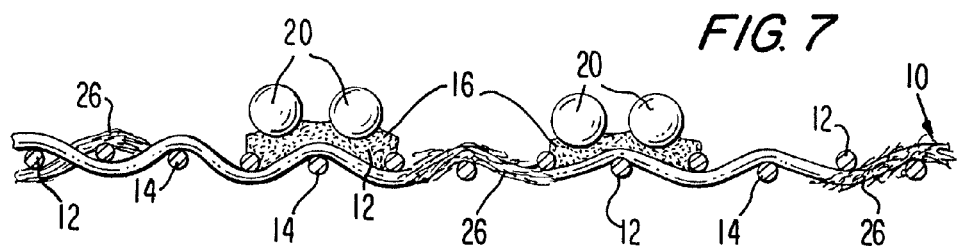

EMBROIDERY AND METHOD OF MAKING SAME

FIELD OF THE DISCLOSURE

This invention generally relates to embroidery and, more particularly, to making embroidery with beaded and/or fully glittered areas.

BACKGROUND

It is known from U.S. Pat. No. 3,377,184 to apply a tacky adhesive, preferably a polyvinylchloride plastisol, to a base fabric material in a desired pattern, and thereupon to apply or flock a plurality of bead-like pieces or particles of synthetic plastic material onto the tacky adhesive. The excess particles are then removed. The adhesive is cured by being heated. The plastic particles are thus fixedly set on the fabric material. The plastic particles actually melt slightly during the curing and fuse with the adhesive. The adhesive may be applied thicker or thinner depending on its proposed use; see, for example, U.S. Pat. No. 3,582,440.

It is also known from U.S. Pat. No. 3,806,397 to apply a multitude of light-reflective flakes (also known as "glitter") onto such an adhesive which has been applied to a release paper material. Each flake has an aluminum core which is coated over its entire periphery with a thin layer of a transparent polyvinylchloride. To cure the adhesive, heat is applied thereto and to the flakes on the adhesive. During this heating step, the transparent layer of polyvinylchloride that coats the flakes melts slightly and fuses with the adhesive. The flakes being essentially two-dimensional, planar and thin, e.g., on the order of 4 mils, lay flat against the release material.

It is further known from U.S. Pat. No. 5,597,434 and U.S. Pat. No. 5,912,065 to place a foil sheet over a plurality of discrete shaped plastic particles or beads and to fix portions of the foil sheet on upper surfaces of the particles. Thereupon, the foil sheet is peeled off the particles, leaving behind the fixed foil sheet portions which act as an irregular light-reflective surface.

It is also known to create burnout fabrics by chemically dissolving cellulose fibers in a composite fabric. Typically, a freezer paper stencil is pressed under dry medium heat and pressure against the fabric, and a brush is used to apply a chemical etchant to the open stencil areas onto the fabric. After removal of the stencil, the etchant is activated, and the cellulose fibers in the open stencil areas are dissolved, thereby transferring the stencil pattern to the fabric.

Although generally satisfactory for their intended purpose, the known processes of making burnout fabrics is labor-intensive, messy and requires expertise in safety handling chemical etchants, while the known processes of applying beads and/or glitter to fabrics do not realistically simulate embroidery prepared by manual sewing needlework on openwork nettings.

OBJECTS OF THE DISCLOSURE

It is a general object of this disclosure to provide a novel method of making embroidery with beaded and/or fully glittered areas.

Another object of this disclosure is to embroider fabric, with beads and/or light-reflective glitter flakes, while avoiding the aforementioned difficulties and drawbacks of the prior art.

Still another object of this disclosure is to make a relatively lightweight fabric having a beaded or light-reflective characteristic that can readily be used in wearing apparel.

Yet another object of this disclosure is to make a beaded or light-reflective fabric that can be folded, cut, rolled, sewn, draped and washed with ease, without the beads or light-reflective glitter flakes falling off the fabric during such procedures.

An additional object of this disclosure is to realistically simulate an openwork, embroidered fabric.

FEATURES OF THE DISCLOSURE

In keeping with these objects and others which will become apparent hereinafter, one feature of this disclosure resides, briefly stated, in a method of making embroidery by forming a fabric of cellulose fibers, and preferably, a composite fabric of cellulose and non-cellulose fibers, and preferably of respective openwork nettings meshed together; by printing a chemical fluid etchant only on selected areas of a pattern on a major surface of the composite fabric; by printing a curable fluid adhesive only on other selected areas of the pattern on the major surface of the composite material; by depositing ornamental particles, such as beads or glitter, onto the curable adhesive at the other selected areas; by heating the composite fabric to cure the adhesive and fix the particles to the other selected areas, and to simultaneously activate the etchant to dissolve the cellulose fibers at the selected areas, of the composite fabric; and by rinsing the composite fabric to remove the chemical etchant.

Thus, in accordance with one aspect of this disclosure, the ornamental particles are anchored in situ while, at the same time, the etchant is activated. Expertise in the safe handling of chemical etchants is no longer required. The printing of the etchant and the adhesive is performed by silk-screening techniques, thereby insuring that the etchant and the adhesive are only applied in their designated areas on the fabric. The use of openwork nettings, especially with beads as the ornamental particles, simulates openwork beaded embroidery in a realistic manner. To further increase the simulation, at least some of the cellulose fibers are left remaining at the selected areas and are not allowed to be dissolved by the etchant. These remaining cellulose fibers resemble sewing threads of the kind used to sew beads onto openwork fabrics.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 is an enlarged sectional view taken on line 4-4 of FIG. 3 and showing a subsequent heating step;

FIG. 5 is a perspective view of the fabric of FIG. 4 during a rinsing step;

FIG. 6 is a perspective view of the embroidery; and

FIG. 7 is an enlarged sectional view taken on line 7-7 of the embroidery of FIG. 6.

Figure 1:
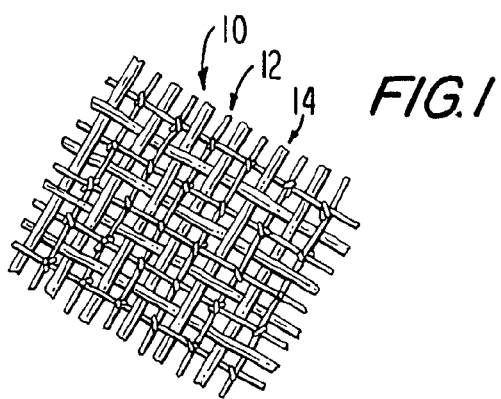
FIG. 1 is an enlarged perspective view of a composite fabric used in the method of making embroidery in accordance with this invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The illustrated elements in the figures have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Referring now to the drawings, reference numeral 10 generally identifies a composite fabric to be embroidered in accordance with an aspect of this invention. FIGS. 2-5 depict the steps of the manufacturing method, and FIGS. 6-7 show the finished embroidered fabric.

As shown in FIG. 1, the fabric 10 comprises an openwork cellulose netting or mesh 12 made of cellulose materials, such as cotton, linen, rayon, ramie and other plant fibers, and preferably also comprising an openwork non-cellulose netting or mesh 14 made of non-cellulose materials, such as wool, silk and synthetic fibers. The meshes 12, 14 are interconnected by being woven or knotted together, or are matted and compressed together, to form the composite fabric. Preferably, the fabric is readily rolled, cut or sewn, so that it can be used for such applications as clothing, handbags, shoes, scarves, etc.

Figure 2:
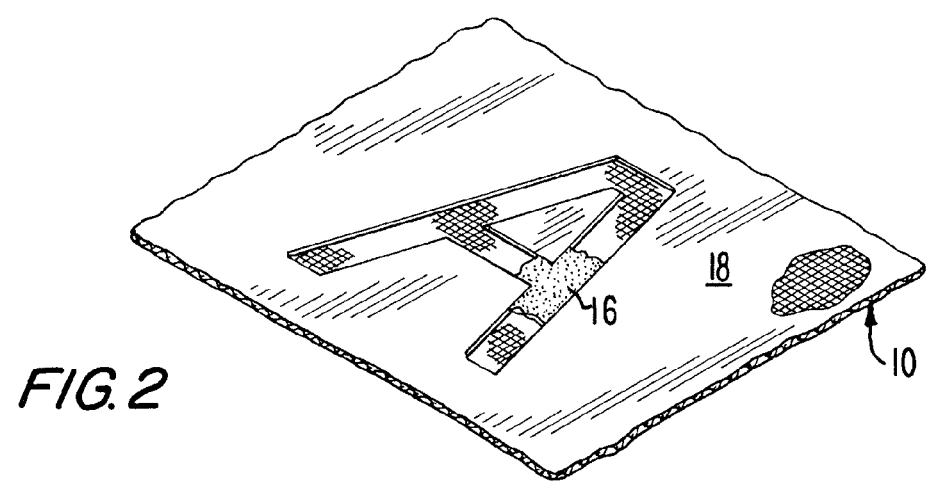
FIG. 2 is a perspective view of the fabric of FIG. 1 after a chemical etchant and an adhesive have been printed thereon.

A layer of an adhesive 16 is applied over an upper major surface of the composite fabric 10 in any desired pattern or design, for example, inside the letter "A" in FIG. 2. Preferably, the adhesive is a curable plastisol which is applied in a liquid state to the fabric 10 through a sieve, stencil, screen or analogous pattern-forming device to obtain the desired pattern. The wet adhesive penetrates slightly among the interstices of the fabric.

Basically, the plastisols are composed of vinyl chloride resin particles dispersed in a plasticizer to which may be added stabilizers, pigments, gelling agents, mineral spirits (for thinning) and similar modifying additives. The formulation of plastisols usable with the present invention is quite wide. For example, based upon 100 parts by weight of vinyl chloride resin, the amount of plasticizer may vary from 50 parts to 200 parts and the amount of pigment, stabilizers and/or other modifying components may vary between 0 and 10 parts.

Typical examples of plastisols which may be used with the present invention are as follows:

EXAMPLE 1

| Plastisols | Pounds |
| --- | --- |
| Polyvinylchloride resin (QYNV) | 100 |
| Diisooctylphthalate | 80 |
| Dibutyl tin maleate | 1 |

EXAMPLE 2

| Plastisols | Pounds |
| --- | --- |
| Polyvinylchloride resin (Geon 121) | 100 |
| Dioctylphthalate | 80 |
| Barium-cadmium laurate | 1 |

EXAMPLE 3

| Plastisols | Pounds |
| --- | --- |
| Polyvinylchloride resin (Exon 654) | 100 |
| Tri cresyl phosphate | 80 |
| Tri basic lead stearate | 2 |

Plastisols made according to the above formulations have the characteristics of pliability, flexibility and softness rather than the stiffness and hardness of other types of adhesives. They may be readily cut or sewn and then can withstand repeated washing or dry cleaning and have good, long-lasting wearing characteristics. If desired, these plastisols may contain pigmentation and may be thinned by mineral spirits. In this manner, the polyvinylchloride may be thinned to be free flowing for a flat appearance, or thickened so as to be viscous to give a high raised appearance where desired.

In the preferred embodiment, the plastisol is applied by being pressed through openings in a silk screen. The plastisol flows freely through the screen openings and will not clog them, thereby assuring that the screen can be re-used. The openings may have extremely fine detail and, hence, the adhesive pattern can be likewise very detailed. The pattern thus defines areas on the fabric to be decorated. Any pattern is intended to be covered by this invention.

A layer of a chemical fluid etchant 18, such as sodium bisulfate or aluminum sulfate that develops mild acids with the application of dry heat, is applied over the upper major surface of the fabric in those areas of the pattern not coated with the adhesive 16, that is, those areas outside of the letter "A" in FIG. 2. The etchant is also applied in a liquid state, preferably using silk-screening, and penetrates slightly among the interstices of the fabric. The same screen, or a different screen, from that used to apply the adhesive, can be used to apply the etchant. Thus, the adhesive and the etchant coat the entire upper surface of the fabric in their designated areas.

A multitude of ornamental particles 20, such as light-reflective particles or glitter flakes, or beads, are deposited or flocked onto the fabric. The flakes are lightweight, two dimensional, planar, thin, e.g., on the order of 1 mil, and small, e.g., on the order of ⅛ of an inch. The flakes are relatively soft so that they can be cut or sewn through and will not scratch a wearer. They are also durable enough to maintain their shape throughout their life and can be washed at normal temperatures. The flakes are relatively light so that a large number may be placed on a piece of the fabric without unduly weighing it down. Any combination of colors, shapes and/or sizes of flakes may be utilized. When beads are employed, they are generally spherical of about ¹⁄₃₂ of an inch in diameter.

The particles 20 are flocked onto the adhesive-coated pattern on the fabric by hand or by using a suitable sieve. The particles stick to the wet, tacky, adhesive-coated areas, and a pattern of particles corresponding to the pattern of the adhesive is laid down on the fabric. The particles cover up the plastisol to a large extent so that the plastisol does not show through. All of these features make the finished embroidered fabric suitable for a wide variety of uses.

Figure 3:
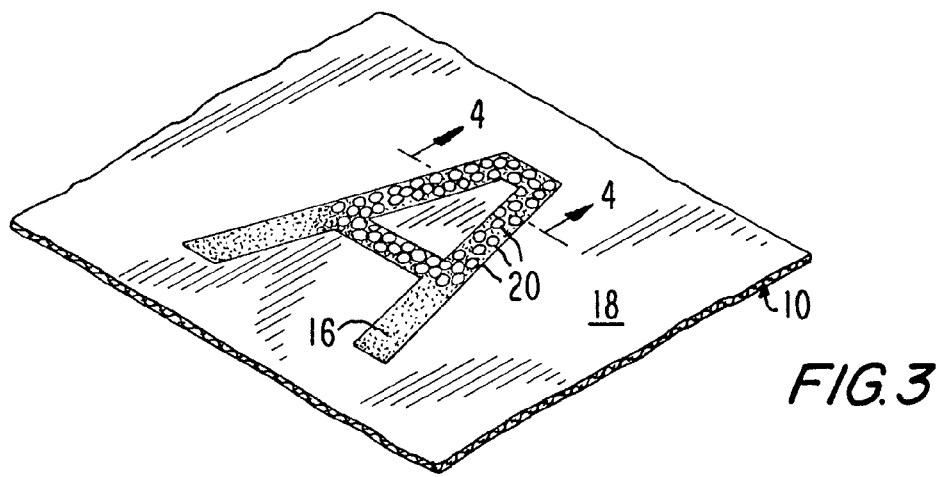
FIG. 3 is a perspective view of the fabric of FIG. 2 after ornamental particles have been deposited thereon.

After the particles are applied to the fabric, the excess particles which did not initially adhere to the plastisol are removed, for example, by shaking the fabric or by using air or gas to blow off the excess particles. Preferably, a vacuum cleaner or analogous suction device picks up the excess particles. Only the excess particles are removed, and the remaining particles contact the plastisol for adherence to the fabric, as shown in FIG. 3.

In order to firmly fix the particles to the fabric, the plastisol is heated to its curing point, i.e., the temperature at which the polyvinylchloride particles in the plastisol solidify. This is accomplished by placing the fabric on a heated plate, or by placing it in an oven, or by using infrared heating lamps, or by using any other suitable heating means 22, as shown in FIG. 4. All of the plastisols described above have a heat curing temperature in the range of between 300° F. to about 400° F., and all will adhere firmly to the fabric. It is preferred that a plastisol which cures at 300° F. and above be used.

In accordance with an embodiment of this invention, the heat used to cure the plastisol is also used to activate the etchant 18 and cause the etchant to dissolve the cellulose fibers only at those areas coated with the etchant. The dissolving of the cellulose fibers continues until the fabric is rinsed and cooled in a rinsing bath 24, as shown in FIG. 5. The resulting embroidered fabric, as shown in FIGS. 6-7, realistically simulates an embroidery made by manual sewing.

To further enhance the simulation, at least some of the cellulose fibers, for example, the fibers 26 in FIG. 7, are left remaining on the areas initially covered by the etchant. The etchant is not allowed to dissolve the cellulose fibers in their entirety, for example, by immersing the fabric in the rinsing bath before the etchant has had a chance to completely dissolve the cellulose fibers. These remaining fibers 26 resemble sewing threads and help create the illusion that the embroidery was hand-made.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of making embroidery, comprising:
   forming a fabric of cellulose fibers;
   printing a chemical fluid etchant only on selected areas of a pattern on a major surface of the fabric;
   printing a curable fluid adhesive only on other selected areas of the pattern on the major surface of the fabric;
   depositing ornamental particles onto the curable adhesive at the other selected areas;
   heating the fabric to cure the adhesive and fix the particles to the other selected areas, and to simultaneously activate the etchant to dissolve the cellulose fibers at the selected areas, of the fabric; and
   rinsing the fabric to remove the chemical etchant.

2. The method of claim 1, wherein the fabric is a composite fabric and also has non-cellulose fibers.

3. The method of claim 2, wherein the cellulose fibers are selected from a group including cotton, linen, rayon, ramie and other plant fibers, and wherein the non-cellulose fibers are selected from a group including wool, silk and synthetic fibers.

4. The method of claim 2, wherein the cellulose fibers are made of an openwork cellulose netting, and wherein the non-cellulose fibers are made of an openwork non-cellulose netting, and wherein the nettings are meshed together to form the composite fabric.

5. The method of claim 1, wherein the etchant printing is applied by screening the etchant through a screen, and wherein the adhesive printing is applied by screening the adhesive through a screen.

6. The method of claim 1, wherein the depositing step is performed by depositing beads as the particles to form the embroidery with beaded areas.

7. The method of claim 1, wherein the depositing step is performed by depositing glitter flakes as the particles to form the embroidery with glittered areas.

8. The method of claim 1, wherein the adhesive printing step is performed by applying a layer of tacky plastisol on the other areas of the pattern.

9. The method of claim 1, wherein the rinsing step is performed before the etchant has fully dissolved the cellulose fibers, at least some of the cellulose fibers remaining on the selected areas of the embroidery to simulate sewing needlework.

\* \* \* \* \*